United States Patent
Sethna et al.

(10) Patent No.: US 6,562,103 B2
(45) Date of Patent: May 13, 2003

(54) PROCESS FOR REMOVAL OF CARBON DIOXIDE FOR USE IN PRODUCING DIRECT REDUCED IRON

(75) Inventors: Rustam H. Sethna, Palatine, IL (US); Michael Whysall, Wilrijk (BE); Kirit M. Patel, Winfield, IL (US)

(73) Assignee: UOP LLC, Des Plaines (*) Notice: Subject to any disclaimer, the term of this patent is extended or adjusted under 35 U.S.C. 154(b) by 0 days.

(21) Appl. No.: 10/228,128

(22) Filed: Aug. 26, 2002

(65) Prior Publication Data

US 2003/0047037 A1 Mar. 13, 2003

Related U.S. Application Data

(63) Continuation-in-part of application No. 09/916,864, filed on Jul. 27, 2001, now abandoned.

(51) Int. Cl.[7] .............................. C21B 13/02
(52) U.S. Cl. ........................ 75/505; 75/496
(58) Field of Search ............................ 75/496, 505

(56) References Cited

U.S. PATENT DOCUMENTS

| | | | |
|---|---|---|---|
| 3,176,444 A | 4/1965 | Kiyonaga | 55/26 |
| 3,430,418 A | 3/1969 | Wagner | 55/25 |
| 3,703,068 A | 11/1972 | Wagner | 55/21 |
| 3,749,386 A | 7/1973 | Beggs et al. | 266/29 |
| 3,764,123 A | 10/1973 | Beggs et al. | 266/29 |
| 3,816,101 A | 6/1974 | Beggs et al. | 75/35 |
| 3,909,244 A | 9/1975 | Rose et al. | 75/35 |
| 3,986,849 A | 10/1976 | Fuderer et al. | 55/25 |
| 4,002,422 A | 1/1977 | Escott | 432/99 |
| 4,046,557 A | 9/1977 | Beggs | 75/35 |
| 4,336,063 A | 6/1982 | Guzmán-Bofill et al. | 75/35 |
| 4,363,654 A | 12/1982 | Frederick et al. | 75/34 |
| 4,375,983 A | 3/1983 | Celada et al. | 75/35 |
| 4,556,417 A | 12/1985 | Martinez-Vera et al. | 75/35 |
| 5,078,787 A | 1/1992 | Becerra-Novoa et al. | 75/443 |
| 5,238,487 A | 8/1993 | Hauk et al. | 75/492 |
| 5,858,057 A | 1/1999 | Celada-Gonzalez et al. | 75/490 |
| 5,882,579 A | 3/1999 | Viramontes-Brown et al. | 266/144 |
| 6,126,717 A | 10/2000 | Gauthier et al. | 75/466 |
| 6,395,056 B1 * | 5/2002 | Villarreal-Trevino et al. | 75/505 |

* cited by examiner

Primary Examiner—Melvyn Andrews
(74) Attorney, Agent, or Firm—John G. Tolomei; Frank S. Molinaro; Mark Goldberg

(57) ABSTRACT

The present invention relates to a pressure swing adsorption process for direct reduction of iron wherein a portion of spent reducing gas withdrawn from the direct reduction reactor is subjected to a PSA process for the removal of carbon dioxide from the spent reducing gas. An improved $CO_2$-rejection method using an external natural gas purge stream after depressurization and before the product purge step is described. The PSA process comprises an external purge step with a non-absorbable gas, which surprisingly reduces the adsorbent regeneration requirements to maintain the selective adsorption of carbon dioxide from the spent reducing gas. The external natural gas purge results in a cleaner bed before the start of each adsorption cycle. Consequently, significantly more $CO_2$ can be rejected and/or higher hydrogen and CO recoveries can be attained. The external purge stream is fully integrated into the DDRI production scheme.

16 Claims, 2 Drawing Sheets

PROCESS FOR REMOVAL OF CARBON DIOXIDE FOR USE IN PRODUCING DIRECT REDUCED IRON

CROSS-REFERENCE TO RELATED APPLICATION

This application is a Continuation-In-Part of application Ser. No. 09/916,864 filed Jul. 27, 2001 now abandoned, the contents of which are hereby incorporated by reference in its entirety.

FIELD OF THE INVENTION

This invention relates generally to the direct reduction of iron oxide material and, more specifically, the present invention relates to the removal of carbon dioxide from spent reducing gas in a process for the direct reduction of iron.

BACKGROUND OF THE INVENTION

Direct reduced iron (DRI) production represents one of the major routes to producing steel. The actual reduction of the iron ore in the direct reduction reactor is carried out in the presence of a reducing gas that comprises hydrogen and carbon monoxide. In the DRI process, the iron is reduced and the carbon dioxide, produced in the reduction reaction, is removed with the spent reducing gas, or reactor off-gas. The reactor off-gas includes unreacted hydrogen, carbon monoxide, carbon dioxide and water. After cooling, the reactor off-gas is vented or reprocessed to remove the carbon dioxide and enrich the hydrogen and carbon monoxide content before returning the enriched off- gas to the direct reduction reactor as the reducing gas. Some schemes use a reforming step to provide more hydrogen and carbon monoxide and some schemes use a water gas shift step to enhance the recycle gas to provide the reducing gas. All of the schemes must remove carbon dioxide to maintain the reduction process.

The direct reduction of iron ore, i.e. iron oxides, is accomplished by reduction of the iron ore by reaction with carbon monoxide, hydrogen and/or solid carbon through successive oxidation states to metallic iron. Typically, oxides of iron and carbonaceous material, e.g. coal, are charged into a furnace. Heat is supplied to the furnace by the combustion of fuel with air to generate, inter alia, carbon monoxide. As the iron ore and reducing agents pass through the furnace, the iron ore is reduced to metallic iron and recovered from the furnace. Furnace gases are removed from the furnace through a flue or exhaust conduit.

Direct reduction plants for producing direct reduced iron, known as DRI (sponge iron) or hot briquetted iron (pre-reduced materials useful as feedstocks for iron and steel making), currently produce such products by contacting a reducing gas, composed principally of hydrogen and carbon monoxide, at effective reduction temperatures in the range from about 750° to about 1050° C., over a bed of particulate iron-containing material in the form of lumps or pellets. Examples of such processes are described in U.S. Pat. No. 3,749,386, U.S Pat. No. 3,764,123, U.S Pat. No. 3,816,101, U.S Pat. No. 4,336,063, U.S Pat. No. 4,556,417, U.S Pat. No. 5,078,787, U.S Pat. No. 4,046,557, U.S Pat. No. 4,002,422 and U.S. Pat. No. 4,375,983.

U.S. Pat. No. 5,238,487 discloses a process for producing direct reduced iron in a reduction reactor fed with top gas effluent from a first reaction reactor attached to a melter-gasifier. The invention of the '487 patent addresses the problems related to carburization and metal dusting of the heater pipes which arise when heating a reducing gas containing a high content of carbon monoxide in a heat exchanger type direct fired heater. More particularly, the '487 patent teaches the withdrawal of oxidants in the top gas effluent and the use of the top gas effluent in a second reduction reactor. A reducing gas is withdrawn from the second reduction reactor. The reducing gas is passed in turn to a cooler/scrubber, a $CO_2$ removal unit, a gas heater to heat the gas to a temperature between 200° and 500° C., and a partial combustion chamber to heat the gas to a temperature between 750° and 850° C., before being returned to the second reactor.

U.S Pat. No. 5,882,579 discloses a method and an apparatus for utilizing in a second reduction reactor the excess exhausted gas from a first reduction reactor fed with a reducing gas produced in a melter-gasifier without the problems of swelling presented by iron ores when reduced by carbon monoxide, thus increasing the capabilities of the reduction system to process a wider range of iron ores. It is disclosed therein that the method for producing DRI comprises providing a source of reducing gas having a high content of carbon monoxide, of about 30% to about 40%. The reducing gas flows through a first reduction reactor where iron ore is pre-reduced and the pre-reduced iron ore is fed to the source of reducing gas for melting and removal as pig iron. Top gas effluent from the first reduction reactor is cooled and cleaned by adding water to the relatively cool and clean gas stream and feeding it to a catalyst-laden vessel to carry out the reaction of carbon monoxide with the water to produce hydrogen and carbon dioxide. Carbon dioxide is removed from the reducing gas, thus producing a reducing gas stream with a hydrogen content above about 65% and utilizing the reducing gas in a second reduction reactor.

U.S Pat. No. 5,858,057 which is hereby incorporated by reference, discloses a similar process for the production of direct reduced iron, wherein the amount of carbon in the direct reduced iron process is controlled by modifying the relative amounts of water, carbon dioxide and oxygen in the composition of the reducing gas returned to the reduction reactor. It is disclosed that the amount of carbon in the direct reduced iron reactor is controlled by the amount of water in the reducing gas, and that the addition of oxygen to the reducing gas provides the energy for the carburization of the direct reduced iron product.

U.S. Pat. No. 3,909,244 discloses a process for modifying the composition of a reducing gas produced from the steam reforming of natural gas reformer to enrich the reducing gas with hydrogen. The rate of reduction is increased by reducing iron ores with a gas essentially composed of hydrogen, and the economy of the regenerating of the recirculating gases is improved.

U.S. Pat. No. 4,363,654 relates to a process for producing a reducing gas for a direct reduction or a blast furnace wherein oil and/or coal is partially oxidized in the presence of air to produce a reducing gas stream containing hydrogen and nitrogen together with other gases. The reducing gas stream is treated to remove essentially all gases other than hydrogen, and the hydrogen is used in reducing iron ores.

Because the reactor off-gas from the DRI reactor is generally produced at low pressure and high temperature, separation methods such as conventional pressure swing adsorption (PSA), or liquid absorption, require that the reactor off-gas be cooled and that the pressure of the cooled reactor off-gas be raised significantly to obtain the necessary driving force to carry out the separation. Liquid absorption systems require steam generation and water treatment systems to comply with environmental regulations. In addition, such solvent-based systems have associated solvent handling and disposal problems. If the pressure of the separation is not raised and an adsorbent-based separation is used, the desorption of the adsorbent must be carried out at a desorption pressure below atmospheric pressure, subjecting a stream comprising hydrogen and carbon monoxide to potentially explosive conditions. Such alternatives are both expensive and potentially explosive. Processes are sought which provide carbon dioxide removal from DRI reactor off-gas at low operating pressure without the danger of explosion.

SUMMARY OF THE INVENTION

Applicant discovered that a PSA process which uses an external purge step following a depressurization step provides an effective way of carrying out the separation of carbon dioxide from DRI spent reducing gas at very low adsorption pressures without requiring a substantial lower desorption pressure. The present invention solves the above problems by using natural gas to purge and desorb $CO_2$ from an adsorption zone. Natural gas, instead of reducing gas, is first used to purge most of the $CO_2$ and water from the adsorption zone. A small amount of product purge may be used after the natural gas purge step to remove some methane and additional $CO_2$ from the adsorption zone. The natural gas used to provide the external purge gas is not lost. A portion of the natural gas is recovered in the reducing gas and recycled to the reactor, while the remaining portion is combined with a $CO_2$-rich stream, which can be used as fuel gas. Preferably, the external purge step is combined with an internal purge step wherein a portion of the product stream is used to purge the adsorbent bed either prior to, or following the external purge step. By use of the external purge step at the lowest pressure in the pressure swing cycle, the adsorbent is surprisingly stripped of adsorbed species to a point resulting in increased carbon dioxide removal rates relative to conventional pressure swing or vacuum swing adsorption units without the need for vacuum equipment or large blowers. The external purge step of the present invention serves to more completely sweep the adsorbent beds of carbon dioxide to a greater extent than conventional PSA processes. This unexpectedly provides enhanced carbon dioxide removal and an improved effective working capacity of the adsorbent relative to the same adsorbent in a conventional PSA process.

In one embodiment, the present invention is a process for the production of direct reduced iron. The process comprises contacting an iron ore stream with a reducing gas stream at effective reducing conditions in a reaction zone and recovering a direct reduced iron product and a reactor off-gas stream. The reducing stream comprises hydrogen and carbon monoxide. The reactor off-gas stream is cooled to provide a cooled reactor off-gas stream. At least a portion of the cooled reactor off-gas stream is passed as a feed stream to a PSA zone. The PSA zone comprises at least two adsorbent beds, wherein each adsorbent bed undergoes a cyclic process comprising an adsorption step, a co-current depressurization step, a counter-current depressurization step, an external purge step and a repressurization step to provide a reducing gas product stream and a tail gas stream. In the cyclic PSA process, the external purge step is conducted following the depressurization step. The reducing gas product stream comprises hydrogen and carbon monoxide and is produced during the adsorption step. The tail gas stream is produced during the depressurization and external purge steps. The reducing gas product stream is heated in a furnace to provide the heated reducing gas stream, which is then sent to the DRI reactor as reducing gas stream.

In another embodiment, the present invention is a process for the low pressure production of direct reduced iron. The process comprises passing a reducing stream and iron ore to a direct reduction reaction zone at effective reduction conditions to produce a direct reduced iron product and a reactor off-gas stream. The reactor off-gas stream is quenched and cooled to provide a cooled off-gas stream comprising hydrogen, carbon monoxide, carbon dioxide and water. At least a portion of the cooled off-gas stream is passed at effective adsorption conditions as a feed stream to a pressure swing adsorption zone comprising at least two adsorbent beds. Each adsorbent bed undergoes a cyclic process consisting of an adsorption step, a co-current depressurization step, a counter-current depressurization step, an external purge step and a repressurization step. In the cyclic process, the external purge step is conducted following the depressurization step to provide a reducing gas product stream comprising hydrogen and carbon monoxide in the adsorption step and to provide a tail gas stream in the depressurization and external purge steps. A water stream is admixed with a remaining portion of the cooled off-gas stream and a hydrocarbon stream to provide a reforming zone feed stream. The reforming zone feed stream is passed to a reforming zone which is indirectly heated by the combustion of a fuel admixture comprising at least a portion of the tail gas stream, an oxygen containing stream and a fuel stream to produce a reformer effluent stream. The reformer effluent stream and the reducing gas product stream are admixed to provide the reducing stream.

DETAILED DESCRIPTION OF THE INVENTION

Figure 1:
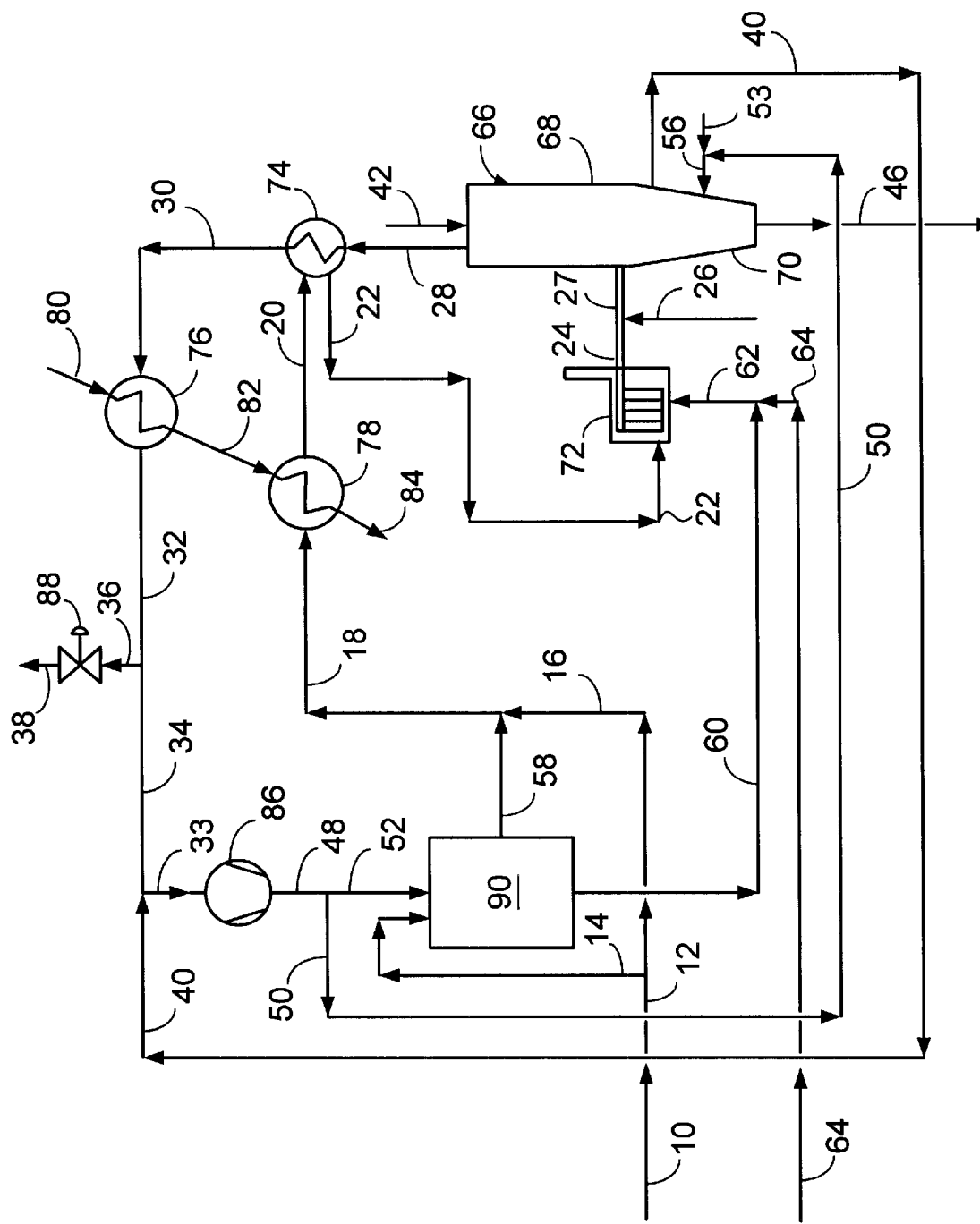
FIG. 1 shows schematically an embodiment of the present invention, illustrating a diagram of the process and apparatus for producing DRI without a steam reforming zone.

The present invention employs a pressure swing adsorption process to remove carbon dioxide from a mixture of hydrogen, carbon monoxide, water and carbon dioxide as found in the reactor off-gas produced in a DRI reactor. The advantage of the present invention is that the particular cycle used in the PSA zone surprisingly avoids the need for subatmospheric regeneration of the adsorbent. PSA provides an efficient and economical means for separating a multi-component gas stream containing at least two gases having different adsorption characteristics. The more strongly absorbable gas can be an impurity, which is removed from the less strongly adsorbable gas, which is taken off as product; or, the more strongly adsorbable gas can be the desired product that is separated from the less strongly adsorbable gas. In PSA, a multi-component gas is typically fed to at least one of a plurality of adsorption zones at an elevated pressure effective to adsorb at least one component, while at least one other component passes through. At a defined time, the feed stream to the adsorber is terminated and the adsorption zone is depressurized by one or more co-current depressurization steps wherein pressure is reduced to a defined level which permits the separated, less strongly adsorbed component or components remaining in the adsorption zone to be drawn off without significant concentration of the more strongly adsorbed components.

Then, the adsorption zone is depressurized by a counter-current depressurization step wherein the pressure on the adsorption zone is further reduced by withdrawing desorbed gas counter-currently to the direction of the feed stream. Finally, the adsorption zone is purged and repressurized. According to the present invention, the adsorption zone is purged with at least a portion of an internal purge gas stream from another adsorption zone undergoing a provide-purge step and an external purge gas stream supplied at a purge gas pressure. The external purge step, wherein the external purge gas stream is provided to the adsorption zone, can occur prior to or following an internal purge step wherein the purge gas is supplied from another adsorption zone undergoing a provide-purge step. The combined gas stream produced during the counter-current depressurization step and the purge step is typically referred to as the tail gas stream. The final stage of repressurization is typically performed by introducing a slipstream of product gas. This final stage of repressurization is often referred to as product repressurization. In multi-zone systems, there are typically additional steps and those noted above may be done in stages. U.S. Pat. No. 3,176,444, U.S Pat. No. 3,986,849, U.S Pat. No. 3,430,418 and U.S. Pat. No. 3,703,068, among others, describe multi-zone, adiabatic PSA systems employing both co-current and counter-current depressurization and the disclosures of these patents are incorporated by reference in their entireties.

In the operation of a continuous PSA process, at least two adsorbent beds containing the selective adsorbent are arranged in parallel and adapted to be operated in a cyclic manner comprising adsorption and desorption steps. In such systems, the adsorbent beds are cycled out-of-phase to provide a continuous PSA process wherein a continuous flow of the feed stream to the PSA process and the continuous recovery of a product stream from process occurs.

According to the present invention, a feed stream is passed to a first adsorbent bed. The direction of the flow of the feed stream through the first adsorbent bed is a point of reference for all other flows in the PSA process. The flows are said to be either co-current (in the same direction) or counter-current (in a direction opposite) to the direction of the feed stream passing through the adsorbent bed.

The adsorbent contained in the adsorbent beds may comprise powdered solid, crystalline compounds capable of adsorbing and desorbing the adsorbable compound. Examples of such adsorbents include silica gels, activated aluminas, activated carbon, molecular sieves and mixtures thereof. Molecular sieves include zeolite molecular sieves. The adsorbents can be employed individually or in combination. Preferably, the adsorbents may be disposed within an adsorbent bed in a plurality of layers wherein a water removal layer comprising activated carbon or alumina is disposed at the bottom of the adsorbent bed, a $CO_2$ adsorption layer including silica gel or zeolite is disposed at the top of the adsorbent bed. The $CO_2$ adsorption layer can comprise only silica gel or a combination of a bottom silica gel layer and a top zeolite layer. Preferably, the zeolite layer comprises a zeolite X or a zeolite Y. More preferably, the top zeolite layer comprises a zinc or sodium exchanged zeolite X or a sodium exchanged zeolite Y. Preferably, the zeolite layer comprises from about 0.01 to about 40 vol-% of the adsorbent bed and the water adsorption layer comprising activated carbon or alumina comprises from about 1 to about 80 vol-% of the adsorbent bed and the $CO_2$ adsorption layer comprising silica gel and/or zeolite comprises from about 0 to about 90 vol-% of the adsorbent bed. More preferably, the water removal layer comprising activated carbon or alumina comprises about 5 to about 10 vol-% and the zeolite layer comprises from about 1 to about 40 vol-% and the silica gel layer comprises from about 0 to about 70 vol-% of the total adsorbent bed. The adsorbent of the present invention preferably is incorporated into solid particles in which the adsorbent is present in an amount effective to promote the desired separation. Solid particles comprising the molecular sieve and a binder may be formed into shapes such as pills, pellets, granules, rings, and spheres. Generally, a slurry mixture comprising the molecular sieve, binder and water is prepared and the slurry mixture is blended by sonification, milling, etc. prior to formation of the solid particles by extrusion, spray-drying, etc. In one aspect, the solid particles comprise an adsorptively effective amount of the adsorbent and at least one matrix material, preferably selected from the group consisting of binder materials, filler materials and mixtures thereof to provide a desired property or properties, e.g., mechanical strength and the like to the solid particles. Filler and binder materials include, for example, synthetic and naturally occurring substances such as metal oxides, clays, silicas, aluminas, silica-aluminas, silica-magnesias, silica-zirconias, silica-thorias, silica-berylias, silica-titanias, silica-alumina-thorias, silica-alumina-zirconias, aluminophosphates, mixtures of these and the like. The preparation of solid particles comprising the adsorbent and matrix materials is conventional and well known in the art and, therefore, need not be discussed in detail.

With reference to FIG. 1, a scheme is described related to direct reduction systems having moving bed reactors, but it is understood that the scheme can be adapted to schemes with fixed bed or fluidized reactors. In FIG. 1, iron ore is introduced to a direct reduction reactor 66 via line 42 and in an upper reduction zone 68, the iron ore is contacted with a reducing gas, introduced via line 24. The reducing gas comprises hydrogen and carbon monoxide. The reduced iron ore is removed from a lower cooling zone 70 of the direct reduction reactor 66 via line 46. A top gas stream, or a reactor off-gas stream, comprising unreacted hydrogen and carbon monoxide also includes water and carbon dioxide. The top gas stream is withdrawn in line 28 from the direct reduction reactor 66 at a top gas temperature of from about 350° to about 500° C. The reduction reaction typically takes place at a reduction temperature of about 750° to about 1050° C. More preferably, the reduction reaction takes place at a reduction temperature of between about 950° and about 1050° C. The top gas stream is cooled in a first cooler 74 by indirect heat exchange with a preheated reducing gas stream in line 20 to provide a first cooled top gas stream in line 30 and a further preheated reducing gas stream in line 22. The first cooled top gas stream in line 30 is passed to a second cooler 76 which exchanges heat with a first water stream in line 80 to provide a second cooled top gas stream in line 32 and a heated first water stream in line 82. At least a portion of the second cooled top gas stream, now at a cooled top gas temperature of about 30° to about 60° C., is passed via lines 32, 34 and 33 to a compressor 86 to compress the second cooled top gas stream to a recycle pressure of about 200 to about 1500 kPa and provide a compressed top gas stream in line 48. More preferably, the cooled top gas temperature ranges between about 35° and about 50° C., and the recycle pressure ranges from about 275 to about 1240 kPa. A portion of the second cooled top gas stream is vented via line 36, valve 88 and line 38 to maintain is pressure control of the system and to purge from the system a portion of undesirable components such as carbon dioxide and nitrogen. At least a portion of the compressed top gas stream is passed via lines 48 and 52 to a PSA zone 90 containing at least two adsorbent beds. Each of the adsorbent beds contains an adsorbent that is selective for the adsorption of carbon dioxide from a mixture of components including hydrogen, carbon monoxide and water. Preferably, the adsorbent is selected from the group consisting of silica gel, molecular sieve, activated carbon, activated alumina and zeolites. More preferably, the adsorbent is selected from the group consisting of silica gel, zeolite X, zeolite A, zeolite Y and mixtures thereof. The PSA zone 90 is operated according to a continuous cycle comprising an adsorption step at an adsorption pressure varying from about 200 to about 1500 kPa, to produce an adsorption effluent stream in line 60. The continuous cycle includes a co-current depressurization step, a counter-current depressurization step which reduced the pressure of the first adsorption bed to a desorption pressure, a purge step, and a repressurization step to return the adsorbent bed to the adsorption pressure. The purge step of the present invention consists of a combination of an internal purge employing provide-purge gas from another adsorbent bed which is undergoing the adsorption step or the co-current depressurization step, and an external purge using an external purge gas stream. Preferably, the external purge gas stream comprises a non-adsorbable gas component such as a natural gas stream shown as being passed to the PSA zone 90 via lines 10, 12 and 14. During the counter-current depressurization and the purge steps, a desorption effluent stream is produced and is withdrawn from the PSA zone 90 via line 58. The external purge stream comprises a flow rate of less than about 10 vol-% of the top gas stream and, more preferably, the external purge stream comprises a flow rate of about 2 to about 8 vol-% of the top gas stream in line 28. One advantage of using natural gas as an external purge gas stream in the PSA zone is that the desorption effluent comprising the external purge stream is returned to be admixed with a second natural gas stream in lines 10, 12 and 16 to produce a gas admixture in line 18. The gas admixture is passed to a first gas preheater 78 wherein the gas admixture is heated by indirect heat exchange with the first heated water stream in line 82 to provide the preheated reducing gas stream in line 20 and a second heated water stream in line 84.

The adsorption effluent in line 60 is combined with a fuel gas stream, or a third natural gas stream in line 64 to produce a fuel admixture in line 62. The fuel admixture in line 62 is passed to a gas heater 72 wherein the preheated reducing gas stream in line 22 is heated to a pre-oxidation temperature of between about 200° and about 500° C. by combustion of the fuel admixture in the gas heater 72 to provide a heater effluent stream in line 24. The heater effluent stream is withdrawn from the gas heater 72 in line 24 and an oxygen-containing stream is introduced to line 24 via line 26 to at least partially combust the gas heater effluent stream to provide a reducing gas stream in line 27 at a reduction temperature between 750° and 850° C., required to carry out the reduction reaction in the direct reduction reactor 66. The major reduction gas loop comprises passing a portion of the compressed top gas stream in line 48 to the direct reduction reactor 66 via lines 48, 50 and 56, and introducing the portion of the compressed top gas stream in line 56 admixed with a fourth water stream in line 53, prior to entering the lower cooling zone 70 of the direct reduction reactor 66. The present invention is employed to maintain an effective reducing gas concentration by removing at least a portion of the carbon dioxide from the reducing gas loop to carry out the direct reduction of the iron ore. In another embodiment, an intermediate gas stream in line 40 comprising hydrogen, carbon monoxide, water and carbon dioxide is withdrawn from the lower cooling zone 70 of the direct reduction reactor 66 via line 40 and admixed with the cooled top gas stream in line 33 and vented through lines 34, 36, valve 88 and line 38 as required to remove inerts and control the pressure of the reactor.

Figure 2:
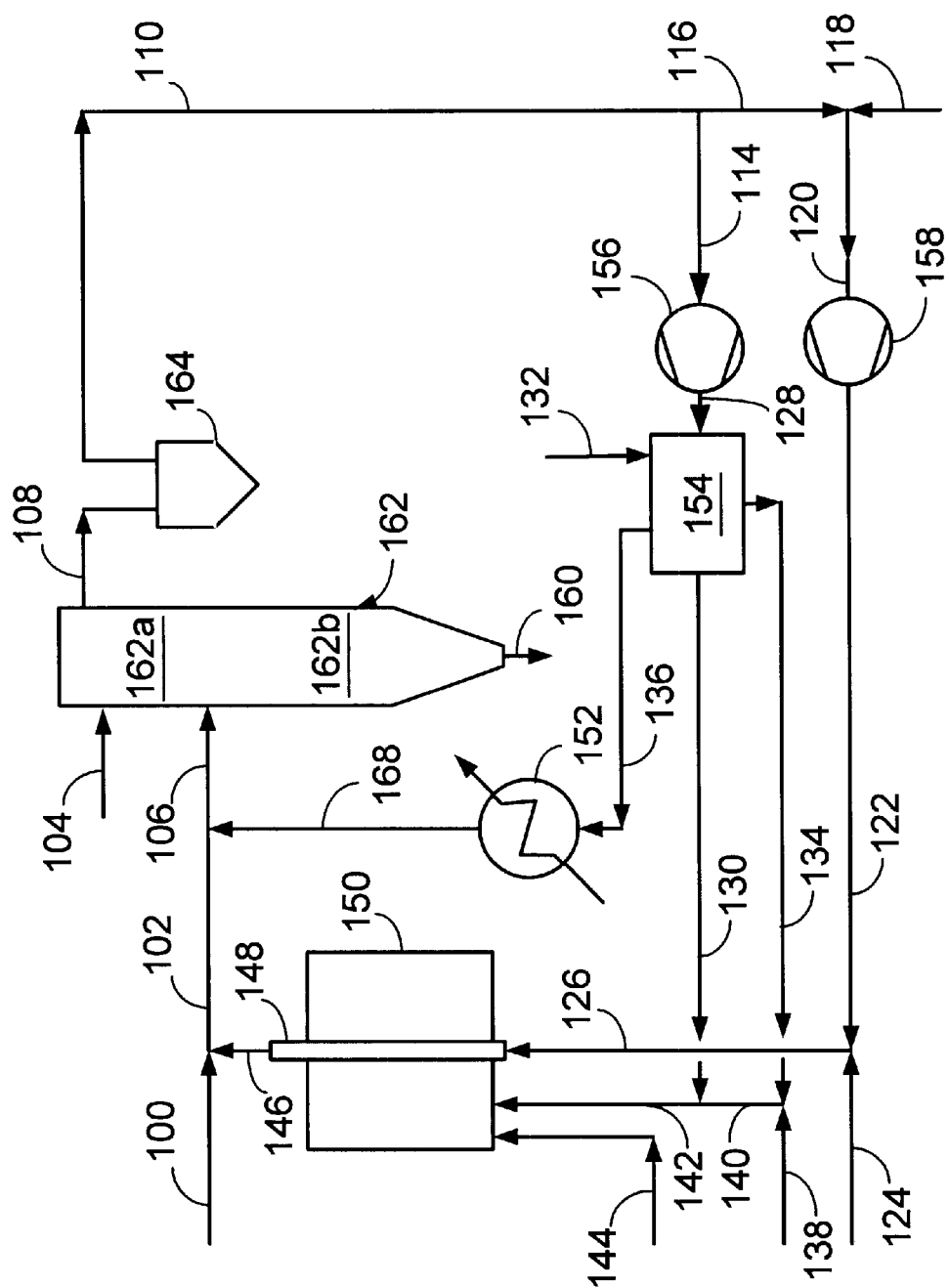
FIG. 2 shows schematically an embodiment of the present invention, illustrating a diagram of the process and apparatus for producing DRI with a steam reforming zone.

Referring to FIG. 2, a schematic flow diagram is shown which relates to the use of the present invention in a direct reduction of iron ore process, which includes a steam reforming zone. An example of a type of direct reduction process in which the present invention is useful is a DRI process which employs a natural gas feed steam reformer to produce the reducing gas comprising hydrogen and carbon monoxide to enrich a circulating reducing gas loop. The PSA zone of the present invention is used to remove at least a portion of the carbon dioxide, which is produced in the direct reduction reactor 162. According to FIG. 2, an iron ore stream in line 104 is passed to a direct reduction reactor 162. The iron ore is contacted in an upper reduction zone 162a with reducing gas comprising hydrogen and carbon monoxide introduced to the direct reduction reactor 162 in line 106. A top gas stream in line 108 is withdrawn from the upper reduction zone 162a, and a reduced iron stream in line 160 is withdrawn from a lower cooling zone 162b of the direct reduction reactor 162. The top gas stream in line 108 is withdrawn from the direct reduction reactor 162 and passed to a quench zone 164 wherein the top gas stream is cooled in a conventional manner to provide a cooled top gas stream in line 110. The cooled top gas stream in lines 110 and 116 is admixed with a first natural gas stream in line 118 to provide a feed gas admixture in line 120 which is passed to a first compressor 158 to provide a compressed reformer feed gas in line 122. The compressed reformer feed gas in line 122 is passed to a steam reforming zone 148 via lines 122 and 126. The steam reforming zone 148 contains a conventional reforming catalyst disposed in indirect thermal contact with a combustion zone 150. The steam reforming zone 148 is heated by the combustion of a fuel stream introduced via lines 138, 140 and 142 in the presence of an oxygen-containing stream introduced via line 144. Additional natural gas in line 124 may be admixed with the compressed reformer feed gas in line 126 to provide additional carbon monoxide in the steam reforming effluent in line 146. A further amount of natural gas in line 100 is admixed with the steam reforming effluent in line 146 to provide the reducing gas stream in line 102. As the direct reduction reaction takes place, carbon dioxide and water are produced. According to the present invention, a portion of the cooled top gas stream in line 110 is passed to a second compressor 156 via line 114 which raises the top gas stream to an effective adsorption pressure of about 345 to about 276 kPa (about 50 to about 40 psia) to produce an adsorption feed stream in line 128.

The adsorption feed stream in line 128 is passed to a PSA zone 154 having at least two adsorbent beds containing an adsorbent selective for the adsorption of carbon dioxide. Each adsorbent bed undergoes a cyclic process comprising an adsorption step wherein the adsorption feed stream is passed to a first adsorbent bed undergoing adsorption at an effective adsorption pressure, and an adsorption effluent stream in line 136 is withdrawn from the first adsorbent bed. The adsorption step is terminated prior to breakthrough of carbon dioxide and the first adsorption bed is co-currently depressurized in a provide-purge step to provide a purge gas stream to another adsorbent bed undergoing an internal purge step. The first adsorbent bed is counter-currently depressurized to a desorption pressure to provide a first desorption effluent. The first adsorption bed is purged with an external purge stream in line 132 and with an internal purge stream from another adsorbent bed undergoing a provide-purge step to produce a second desorption effluent stream comprising carbon dioxide and methane. The first adsorbent bed is counter-currently repressurized with a portion of the adsorption effluent to return the first adsorbent bed to the adsorption pressure. The net adsorption effluent stream is withdrawn via line 136 and passed to a heater 152 which raises the net adsorption effluent stream to effective reduction conditions to provide a heated adsorption effluent stream in line 168. The heated adsorption effluent stream in line 168, now depleted of carbon dioxide relative to the top gas stream, is admixed with the reducing gas stream in line 102 prior to passing the reducing gas stream to the direct reduction reactor 162 via line 106. The first desorption effluent stream in line 130 is admixed with the fuel stream in lines 138 and 140 prior to passing the fuel stream to the combustion zone 150 via lines 134, 140 and 142. The second desorption effluent stream in line 134 is passed via line 134 to be admixed with the fuel stream in line 138 prior to passing the fuel stream to the combustion zone 150. In the PSA zone 154, it is desired to reduce the carbon dioxide concentration in the adsorption effluent to less than about 7.5 mol-% while maintaining the recoveries of hydrogen and carbon monoxide at least 93 and 81, respectively. Preferably, the adsorption pressure ranges from about 200 to about 1000 kPa. More preferably, the adsorption pressure ranges from about 300 to about 600 kPa. The external purge unexpectedly provides desired recoveries without using a vacuum pump or a compressor, which results in lower capital cost and operating cost. Preferably, the external purge stream in line 132 ranges from about 10% to about 25% of the top gas stream in line 108.

EXAMPLES

Example I

The following evaluation is based on adsorption and separation data obtained from the operation of a PSA pilot plant. The pilot plant was placed in operation on a feedstock having for the evaluation of adsorbents and PSA cycles. The pilot plant consisted of a single adsorbent chamber about 3 meters long and about 3.8 centimeters in diameter and containing about 3400 cc of silica gel adsorbent along with the ancillary vessels, valves and connecting piping required to simulate multi-bed PSA cycles. The feed to the pilot plant comprised carbon dioxide, hydrogen, nitrogen, carbon monoxide and methane. The external purge stream comprised essentially pure methane. The chamber was operated in a cyclic adsorption and desorption sequence over a range of operating pressures from an adsorption pressure of about 1.14 MPa (165 psia) to a desorption pressure of about 186 kPa (27 psia). The basic cycle consisted of an adsorption step, a co-current equalization step, a co-current depressurization step to provide purge gas, a counter-current depressurization step to produce a portion of the tail gas stream, a constant pressure purge step to produce the remainder of the tail gas and a repressurization step. The gas stream produced during the provide-purge step was used to purge another bed during the purge step. The external methane purge step of the present invention was added at a point in the cycle at a point prior to the constant pressure purge step. The feed temperature was maintained at a feed temperature which averaged about 43° C. The temperature of the adsorbent chamber was essentially the same as the feed temperature or within about 6° C. of the feed temperature, with little variation during the adsorption time in the cycle. The PSA cycle time employed for the tests comprised an adsorption time, which ranged from about 2 minutes to about 4 minutes. Thus, the total cycle time ranged from about 4 minutes to about 8 minutes. The product and tail gas compositions were measured by chromatographic means. The composition of the feed to the PSA unit averaged about 13 vol-% carbon dioxide. The average feed composition for the pilot plant determinations is shown in Table 1. The results of the series of pilot plant runs are shown in Table 2.

TABLE 1

Average Feed Composition

| Component | Average Composition, Mol-% |
|---|---|
| Carbon Dioxide | 12.7 |
| Hydrogen | 50.1 |
| Methane | 20.2 |
| Carbon Monoxide | 16.0 |

TABLE 2

Pilot Plant Results

| Component Recoveries, % | Base Case No External Purge | 3% External Purge | 5% External Purge |
|---|---|---|---|
| Carbon Dioxide | 29.0 | 29.6 | 28.7 |
| Hydrogen | 93.0 | 93.6 | 95.1 |
| Purge/Feed (%) | 0.0 | 3.0 | 5.0 |
| Relative Bed Size | 100 | 90 | 80 |
| Tail Gas Pressure, kPa | 160 | 190 | 190 |

The results of the pilot plant study showed that the use of an external methane purge provided essentially the same carbon dioxide recovery or removal rate as the base case which did not employ the external methane purge stream. At an external purge rate of about 3% of the feed rate, the overall efficiency of the process increased by about 10% as indicated by the reduction in bed size factor and, at an external purge rate of about 5% of the feed rate, the overall efficiency of the process increased by about 20% as indicated by the reduction in bed size factor, while gaining 2 points in $H_2$ recovery.

Example II

Based on the results of the pilot plant study in Example I, an engineering simulation of a commercial PSA cycle having two equalization steps and operating at the same adsorption pressure and cycle times indicates significant cost savings can be achieved over a base case without an external purge stream by a cycle based on the present invention. A 12 bed cycle, wherein there are 12 adsorbent beds arranged such that three adsorbent beds are undergoing an adsorption step at any time and each adsorbent bed undergoes two equalization steps, was considered with and without an external methane purge step. Both a case without the methane purge step and a case with the methane purge step can achieve the same carbon dioxide rejection. The difference between the cases is in the pressure level to which the tail gas must be reduced to achieve the desired recovery of carbon dioxide. The tail gas pressure, that is the pressure at which the tail gas is produced without the methane purge step, produces a tail gas stream at a pressure of about 130 kPa (19 psia) and required a blower to raise the tail gas stream to an acceptable discharge pressure. The tail gas pressure in the corresponding cycle with a methane purge results in a tail gas pressure of about 184 kPa (27 psia), which is acceptable and does not require an additional blower to raise the tail gas pressure. For a plant processing about 340,000 Nm$^3$/hr of feed, this represents about 15% capital saving and an additional operation cost advantage of about 360,000 dollars per year for the present invention over the conventional scheme without a methane purge step.

What is claimed is:

1. A process for the production of direct reduced iron comprising:
   a) contacting an iron oxide stream at effective reducing conditions with a reducing gas stream comprising hydrogen and carbon monoxide in a reaction zone and recovering a direct reduced iron product and a reactor off-gas stream comprising carbon monoxide, hydrogen, carbon dioxide and water and cooling the reactor off-gas stream to provide a cooled reactor off-gas stream;
   b) passing a portion of the cooled reactor off-gas stream as a feed stream to a pressure swing adsorption zone comprising at least two adsorbent beds for adsorption of carbon dioxide and water, each adsorbent bed undergoing a cyclic process consisting of an adsorption step, a co-current depressurization step, a counter-current depressurization step, an external purge step comprising passing an external purge stream comprising natural gas to the adsorbent beds, and a repressurization step wherein the external purge step is conducted following the counter-current depressurization step to provide a reducing gas product stream comprising hydrogen and carbon monoxide during said adsorption step and to provide a tail gas stream during the counter-current depressurization and external purge steps; and
   c) heating the reducing gas product stream in a furnace to provide a heated reducing gas stream and directly oxidizing a portion of the heated reducing gas stream to provide the reducing gas stream.

2. The process of claim 1 wherein a ratio of the external purge stream to the feed stream comprises between about 0.02 to about 0.5.

3. The process of claim 1 wherein the counter-current depressurization step comprises counter-currently depressurizing each adsorbent bed in the cyclic process to a purge pressure greater than atmospheric pressure.

4. The process of claim 1 further comprising combining at least a portion of the tail gas stream with a fuel stream to produce a fuel admixture and burning the fuel admixture in the furnace.

5. The process of claim 4 wherein the fuel admixture comprises components selected from the group consisting of hydrogen, nitrogen, and methane.

6. The process of claim 1 wherein an internal purge step is performed before or after the external purge step.

7. The process of claim 1 wherein the adsorbent bed contains an adsorbent selected from the group consisting of activated carbon, activated alumina, silica gel, zeolites, and mixtures thereof.

8. The process of claim 1 wherein each of the adsorbent beds contains a total adsorbent bed having a plurality of adsorbent layers, including a water adsorption layer at a bottom end, and a carbon dioxide adsorption layer at a top end.

9. The process of claim 8 wherein the water adsorption layer comprises alumina or activated carbon and the carbon dioxide adsorption layer contains a carbon dioxide selective adsorbent from the group consisting of silica gel, zeolite, and mixtures thereof.

10. The process of claim 8 wherein the carbon dioxide adsorption layer contains a carbon dioxide selective adsorbent selected from the group consisting of silica gel, zeolite X, zeolite Y and mixtures thereof.

11. The process of claim 8 wherein the water adsorption layer comprises from about 1 to about 80 volume percent of the adsorbent bed, and the carbon dioxide adsorption layer comprises from about 0 to about 90 volume percent of the total adsorbent bed.

12. The process of claim 8 wherein the carbon dioxide layer comprises about 1 to about 40 volume percent of the total adsorbent bed.

13. The process of claim 1 wherein the cyclic pressure swing adsorption process comprises:
   a) passing the feed stream comprising hydrogen, carbon monoxide and carbon dioxide in the adsorption step to a first adsorption bed of the at least two adsorption beds, each adsorbent bed containing a carbon dioxide selective adsorbent, to provide the reducing gas product stream comprising hydrogen and carbon monoxide;
   b) co-currently depressurizing the first adsorbent bed in the at least one equalization step with another adsorbent bed;
   c) further co-currently depressurizing the first adsorbent bed in the provide-purge step to provide a provide-purge stream to the other adsorbent bed undergoing an internal purge step;
   d) counter-currently depressurizing the first adsorbent bed to provide a first portion of a tail gas stream;
   e) counter-currently purging the first adsorbent bed with an external purge stream to provide a second portion of the tail gas stream;
   f) counter-currently purging the first adsorbent bed with the provide-purge stream to provide a third portion of the tail gas stream;
   g) repressurizing the first adsorbent bed; and
   h) combining the first, second and third portions of the tail gas stream to provide the tail gas stream.

14. A process for the low pressure production of direct reduced iron, said process comprising:
   a) passing a reducing stream and iron ore to a direct reduction reaction zone at effective reduction conditions to produce a direct reduced iron product and a reactor off-gas stream;
   b) quenching and cooling the reactor off-gas stream to provide a cooled off-gas stream comprising hydrogen, carbon monoxide, carbon dioxide and water;
   c) passing at effective adsorption conditions at least a portion of the cooled off-gas stream as a feed stream to a pressure swing adsorption zone comprising at least two adsorbent beds, each adsorbent bed undergoing a cyclic process consisting of an adsorption step, a co-current depressurization step, a counter-current depressurization step, an external purge step and a repressurization step wherein the external purge step is conducted following the counter-current depressurization step to provide a reducing gas product stream comprising hydrogen and carbon monoxide in said adsorption step and to provide a tail gas stream in the depressurization and external purge steps;
   d) admixing a water stream, a remaining portion of the cooled off-gas stream and a hydrocarbon stream to provide a reforming zone feed stream and passing the reforming zone feed stream to a reforming zone indirectly heated by the combustion of a fuel admixture comprising at least a portion of the tail gas stream, an oxygen containing stream and a fuel stream to produce a reformer effluent stream; and e) admixing the reformer effluent stream and the reducing gas product stream to provide the reducing stream.

15. The process of claim 14 wherein the effective adsorption conditions comprises an adsorption pressure less than about 483 kPa (70 psia) and an adsorption temperature less than about 50° C.

16. The process of claim 14 further comprising heating the reducing gas product stream prior to step (e).

* * * * *